United States Patent
Wang et al.

(10) Patent No.: US 12,009,783 B2
(45) Date of Patent: Jun. 11, 2024

(54) FAULT DETECTION METHOD, FAULT DETECTION APPARATUS FOR PHOTOVOLTAIC MODULE AND COMPUTER-READABLE STORAGE MEDIUM

(71) Applicant: Huawei Digital Power Technologies Co., Ltd., Shenzhen (CN)

(72) Inventors: Jianqiang Wang, Shanghai (CN); Song Wan, Shanghai (CN); Yanzhong Zhang, Shanghai (CN); Yongbing Gao, Shanghai (CN); Xinyu Yu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 360 days.

(21) Appl. No.: 17/473,534

(22) Filed: Sep. 13, 2021

(65) Prior Publication Data
US 2021/0408968 A1    Dec. 30, 2021

Related U.S. Application Data

(63) Continuation of application No. PCT/CN2020/094424, filed on Jun. 4, 2020.

(30) Foreign Application Priority Data

Sep. 26, 2019  (CN) .......................... 201910919753.5

(51) Int. Cl.
H02H 7/00    (2006.01)
H02H 1/00    (2006.01)
(Continued)

(52) U.S. Cl.
CPC ........... *H02S 50/15* (2014.12); *H02H 1/0007* (2013.01); *H02H 7/20* (2013.01)

(58) Field of Classification Search
None
See application file for complete search history.

(56) References Cited

U.S. PATENT DOCUMENTS

2011/0153228 A1*  6/2011  Ahmad ................ G01R 31/308
                                                        356/237.5
2015/0155829 A1*  6/2015  Stoicescu ................ H02S 50/10
                                                        324/761.01
(Continued)

FOREIGN PATENT DOCUMENTS

CN    102812347 A    12/2012
CN    104471383 A     3/2015
(Continued)

OTHER PUBLICATIONS

Jinghu, "Remote Sensing Digital Image Processing Basic Experiment Course," Total 11 pages, Environmental Science Press (2019). With an English Abstract.

*Primary Examiner* — Stephen W Jackson
(74) *Attorney, Agent, or Firm* — Leydig, Voit & Mayer, Ltd.

(57) ABSTRACT

A fault detection apparatus includes an image capture module and a detection module, and the fault detection apparatus is configured to capturing an image of the photovoltaic module in a light emitting state, and performing fault detection on the photovoltaic module based on the image when a signal-to-noise ratio of the image is maximized, to identify a fault type of the photovoltaic module.

7 Claims, 6 Drawing Sheets

(51) Int. Cl.
*H02H 7/20* (2006.01)
*H02S 50/15* (2014.01)

(56) References Cited

U.S. PATENT DOCUMENTS

2017/0133974 A1* 5/2017 Safir .................. H01L 31/0443
2022/0247351 A1* 8/2022 Wachman .............. G06V 30/42

FOREIGN PATENT DOCUMENTS

| | | |
|---|---|---|
| CN | 105119571 A | 12/2015 |
| CN | 105281665 A | 1/2016 |
| CN | 205265626 U | 5/2016 |
| CN | 105915179 A | 8/2016 |
| CN | 206595963 U | 10/2017 |
| CN | 107607517 A | 1/2018 |
| CN | 107659266 A | 2/2018 |
| CN | 207053469 U | 2/2018 |
| CN | 108988787 A | 12/2018 |
| CN | 110752825 A | 2/2020 |
| WO | 2019055908 A2 | 3/2019 |
| WO | 2019117228 A1 | 6/2019 |
| WO | 2019144317 A1 | 8/2019 |

\* cited by examiner

FAULT DETECTION METHOD, FAULT DETECTION APPARATUS FOR PHOTOVOLTAIC MODULE AND COMPUTER-READABLE STORAGE MEDIUM

CROSS-REFERENCE TO RELATED APPLICATIONS

This application is a continuation of International Application No. PCT/CN2020/094424, filed on Jun. 4, 2020, which claims priority to Chinese Patent Application No. 201910919753.5, filed on Sep. 26, 2019. The disclosures of the aforementioned applications are hereby incorporated by reference in their entireties.

TECHNICAL FIELD

This application relates to the field of photovoltaic power generation technologies, and in particular, to a fault detection method, a fault detection apparatus for a photovoltaic module and a computer-readable storage medium.

BACKGROUND

A photovoltaic module is a core part of a solar power generation system, and quality of the photovoltaic module directly determines power generation performance of the solar power generation system. Therefore, detecting a photovoltaic module in a solar power generation system is an essential process.

Currently, a common method for detecting a photovoltaic module in a solar power generation system is electroluminescent (EL) detection. In a conventional EL detection method, electric energy is provided for a photovoltaic module to make the photovoltaic module emit light, and an image of the photovoltaic module in a light emitting state is captured and analyzed, to detect a defect of the module.

In the conventional EL detection method, in an image capture phase, due to impact of environmental factors (such as a temperature, a wind speed, and rain), a signal-to-noise ratio of a captured light emitting image of the module is usually low, making it relatively difficult to meet a requirement for subsequent fault identification of the module.

SUMMARY

Embodiments of this application disclose a fault detection method and a fault detection apparatus for a photovoltaic module, which can ensure quality of a captured image, thereby reducing subsequent fault identification difficulty and an image processing workload.

According to a first aspect, an embodiment of this application discloses a fault detection method for a photovoltaic module. The method includes: acquiring an image of the photovoltaic module in a light emitting state; and performing fault detection on the photovoltaic module based on the image when a signal-to-noise ratio of the image is maximized, to identify a fault type of the photovoltaic module.

For example, the photovoltaic module emits light under action of power supply equipment or an excitation light source.

When the signal-to-noise ratio of the image is maximized, definition of the image is optimal, that is, resolution of the image may be highest.

According to the fault detection method for the photovoltaic module in this embodiment of this application, fault detection is performed on the photovoltaic module based on the image when the signal-to-noise ratio of the image is maximized, to identify the fault type of the photovoltaic module, so that quality of an image captured by an image capture module can be ensured even under impact of an external environment factor, and a subsequent fault identification requirement can be met.

In an embodiment, the power supply equipment is an inverter. The inverter transmits electric energy to the photovoltaic module, so that in a case of a single transmission of electric energy to the photovoltaic module, an electroluminescent effect may occur in all photovoltaic modules connected to the inverter, so that light emitting images of all the photovoltaic modules connected to the inverter can be captured and fault detection can be performed. In this way, there is no need to spend time searching for a power port of the photovoltaic module, thereby helping improve fault detection efficiency.

In an embodiment, the fault detection method further includes: determining whether the signal-to-noise ratio of the image is maximized; and when the signal-to-noise ratio of the image is not maximized, sending an adjustment instruction to the power supply equipment to adjust a power supply parameter of the power supply equipment until the signal-to-noise ratio of the captured image is maximized.

In this embodiment of this application, if the signal-to-noise ratio of the image is not maximized, the adjustment instruction is sent to the power supply equipment to adjust the power supply parameter, to form closed-loop control of image capture, so that a light emitting image with a maximized signal-to-noise ratio can be captured. In this way, the image whose signal-to-noise ratio is maximized can be captured without manual confirmation, thereby simplifying an image capture process.

In some embodiments, the sending an adjustment instruction to the power supply equipment to adjust a power supply parameter of the power supply equipment specifically includes: sending the adjustment instruction to the power supply equipment, so that the power supply equipment adjusts the power supply parameter based on the adjustment instruction and a preset curve. In this way, a power supply parameter corresponding to the maximized signal-to-noise ratio of the image can be found as soon as possible, and image capture efficiency can be improved.

The power supply parameter includes a current parameter, a power parameter, or a voltage parameter. The preset curve is a preset current curve, a preset power curve, or a preset voltage curve.

Different faults of the module may correspond to different power supply parameters, that is, only some faults may be analyzed after one image capture. Therefore, to meet different requirements for module defect identification granularities, the power supply parameter needs to be set in segments, and a light emitting image of the module with an optimized signal-to-noise ratio under each power supply parameter segment is captured. In other words, in an embodiment, the power supply parameter includes a first power supply parameter segment and a second power supply parameter segment. The fault type includes a first fault type and a second fault type. The first power supply parameter segment corresponds to the first fault type, and the second power supply parameter segment corresponds to the second fault type. The first power supply parameter segment and the second power supply parameter segment may or may not overlap.

In some embodiments, the sending an adjustment instruction to the power supply equipment to adjust a power supply parameter of the power supply equipment specifically includes: sending the adjustment instruction to the power supply equipment, so that the power supply equipment adjusts the power supply parameter based on the adjustment instruction and a reference curve.

The reference curve includes a current-voltage reference curve, a power-voltage reference curve, or a power-current reference curve. The power supply parameter includes a current parameter, a voltage parameter, or a power parameter.

According to a second aspect, an embodiment of this application discloses a fault detection apparatus for a photovoltaic module, including an image capture module and a detection module. The image capture module is configured to capture an image of the photovoltaic module in a light emitting state. The detection module is configured to perform fault detection on the photovoltaic module based on the image when a signal-to-noise ratio of the image is maximized, to identify a fault type of the photovoltaic module.

For example, the photovoltaic module emits light under action of power supply equipment or an excitation light source.

When the signal-to-noise ratio of the image is maximized, definition of the image is optimal, that is, resolution of the image may be highest.

According to the fault detection apparatus for the photovoltaic module in this embodiment of this application, the detection module performs fault detection on the photovoltaic module based on the image when the signal-to-noise ratio of the image is maximized, to identify the fault type of the photovoltaic module. In this way, quality of the image captured by the image capture module can be ensured even under impact of an external environment factor, and a subsequent fault identification requirement can be met.

In an embodiment, the power supply equipment is an inverter. The inverter transmits electric energy to the photovoltaic module, so that in a case of a single transmission of electric energy to the photovoltaic module, an electroluminescent effect may occur in all photovoltaic modules connected to the inverter, so that light emitting images of all the photovoltaic modules connected to the inverter can be captured and fault detection can be performed. In this way, there is no need to spend time searching for a power port of the photovoltaic module, thereby helping improve fault detection efficiency.

In an embodiment, the fault detection apparatus further includes a determining module. The determining module is configured to determine whether the signal-to-noise ratio of the image is maximized, and when the signal-to-noise ratio of the image is not maximized, send an adjustment instruction to the power supply equipment to adjust a power supply parameter of the power supply equipment until the signal-to-noise ratio of the captured image is maximized.

In this embodiment of this application, if the signal-to-noise ratio of the image is not maximized, the determining module sends the adjustment instruction to the power supply equipment to adjust the power supply parameter, to form closed-loop control of image capture, so that a light emitting image with a maximized signal-to-noise ratio can be captured. In this way, the image whose signal-to-noise ratio is maximized can be captured without manual confirmation, thereby simplifying an image capture process.

In an embodiment, the power supply equipment is configured to adjust the power supply parameter based on the adjustment instruction and a preset curve. In this way, a power supply parameter corresponding to the maximized signal-to-noise ratio of the image can be found as soon as possible, and image capture efficiency can be improved.

In an embodiment, the power supply parameter includes a current parameter, a power parameter, or a voltage parameter. The preset curve is a preset current curve, a preset power curve, or a preset voltage curve.

Different faults of the module may correspond to different power supply parameters, that is, only some faults may be analyzed after one image capture. Therefore, to meet different requirements for module defect identification granularities, the power supply parameter needs to be set in segments, and a light emitting image of the module with an optimized signal-to-noise ratio under each power supply parameter segment is captured. In other words, in an embodiment, the power supply parameter includes a first power supply parameter segment and a second power supply parameter segment. The fault type includes a first fault type and a second fault type. The first power supply parameter segment corresponds to the first fault type, and the second power supply parameter segment corresponds to the second fault type. The first power supply parameter segment and the second power supply parameter segment may or may not overlap.

In an embodiment, the power supply equipment is configured to adjust the power supply parameter based on the adjustment instruction and a reference curve. The reference curve includes a current-voltage reference curve, a power-voltage reference curve, or a power-current reference curve. The power supply parameter includes a current parameter, a voltage parameter, or a power parameter.

According to a third aspect, an embodiment of this application discloses a fault detection system for a photovoltaic module. The fault detection system includes an image capture device and a detection apparatus. The image capture device is configured to capture an image of the photovoltaic module in a light emitting state. The image capture device is further configured to send the image to the detection apparatus when a signal-to-noise ratio of the image is maximized. The detection apparatus is configured to perform fault detection on the photovoltaic module based on the image captured by the image capture device, to identify a fault type of the photovoltaic module.

For example, the photovoltaic module emits light under action of power supply equipment or an excitation light source.

When the signal-to-noise ratio of the image is maximized, definition of the image is optimal, that is, resolution of the image may be highest.

According to the fault detection system for the photovoltaic module in this embodiment of this application, when the photovoltaic module emits light under action of electric energy provided by the power supply equipment, the image capture device is configured to capture the image of the photovoltaic module in the light emitting state, and the image capture device is further configured to send the image to the detection apparatus for fault detection when the signal-to-noise ratio of the image is maximized. Because the image is sent to the detection apparatus for fault detection only when it is determined that the signal-to-noise ratio of the image is maximized, quality of the image captured by the image capture device can be ensured even under impact of an external environment factor, and a subsequent fault identification requirement can be met.

In an embodiment, the power supply equipment is an inverter. The inverter transmits electric energy to the photovoltaic module, so that in a case of a single transmission of electric energy to the photovoltaic module, an electroluminescent effect may occur in all photovoltaic modules connected to the inverter, so that light emitting images of all the photovoltaic modules connected to the inverter can be captured and fault detection can be performed. In this way, there is no need to spend time searching for a power port of the photovoltaic module, thereby helping improve fault detection efficiency.

In an embodiment, the image capture device is further configured to: determine whether the signal-to-noise ratio of the image is maximized; and when the signal-to-noise ratio of the image is not maximized, send an adjustment instruction to the power supply equipment to adjust a power supply parameter of the power supply equipment until the signal-to-noise ratio of the captured image is maximized.

In this embodiment of this application, if the signal-to-noise ratio of the image is not maximized, the image capture device sends the adjustment instruction to the power supply equipment to adjust the power supply parameter, to form closed-loop control of image capture, so that a light emitting image with a maximized signal-to-noise ratio can be captured. In this way, the image whose signal-to-noise ratio is maximized can be captured without manual confirmation, thereby simplifying an image capture process.

In an embodiment, the power supply equipment is configured to adjust the power supply parameter based on the adjustment instruction and a preset curve. In this way, a power supply parameter corresponding to the maximized signal-to-noise ratio of the image can be found as soon as possible, and image capture efficiency can be improved.

In an embodiment, the power supply parameter includes a current parameter, a power parameter, or a voltage parameter. The preset curve is a preset current curve, a preset power curve, or a preset voltage curve.

Different faults of the module may correspond to different power supply parameters, that is, only some faults may be analyzed after one image capture. Therefore, to meet different requirements for module defect identification granularities, the power supply parameter needs to be set in segments, and a light emitting image of the module with an optimized signal-to-noise ratio under each power supply parameter segment is captured. In other words, in an embodiment, the power supply parameter includes a first power supply parameter segment and a second power supply parameter segment. The fault type includes a first fault type and a second fault type. The first power supply parameter segment corresponds to the first fault type, and the second power supply parameter segment corresponds to the second fault type.

In an embodiment, the power supply equipment is configured to adjust the power supply parameter based on the adjustment instruction and a reference curve. The power supply parameter includes a current parameter, a voltage parameter, or a power parameter. The reference curve includes a current-voltage reference curve, a power-voltage reference curve, or a power-current reference curve.

According to a fourth aspect, an embodiment of this application discloses a computer-readable storage medium. The computer-readable storage medium stores a program instruction for fault detection. The program instruction is used to perform the fault detection method for the photovoltaic module according to the first aspect after being invoked.

BRIEF DESCRIPTION OF DRAWINGS

To describe the technical solutions in the embodiments of this application or in the background, the following briefly describes the accompanying drawings for describing the embodiments of this application or the background.

DESCRIPTION OF EMBODIMENTS

This application provides a fault detection method and a fault detection apparatus for a photovoltaic module. The fault detection method is used to identify and detect a fault of a photovoltaic module, to ensure quality of the photovoltaic module. The following describes the embodiments of this application with reference to accompanying drawings.

Figure 1:
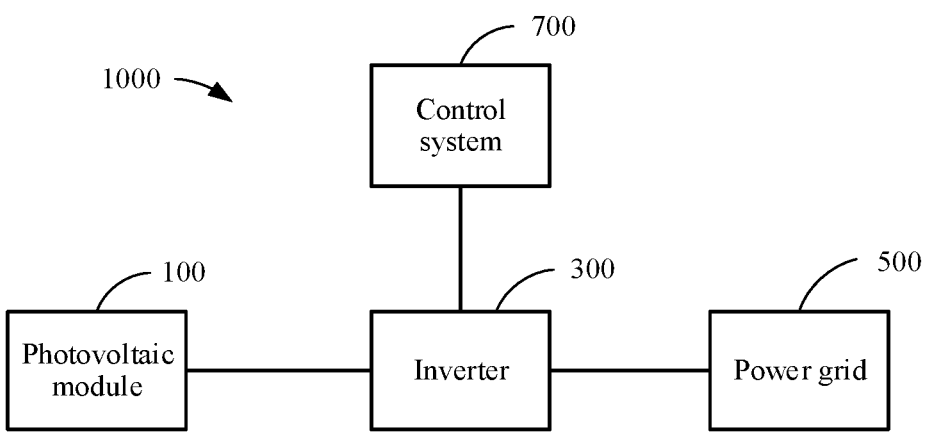
FIG. 1 is a schematic structural diagram of a solar power generation system according to an embodiment of this application.

Referring to FIG. 1, a solar power generation system 1000 according to an embodiment of this application may include a photovoltaic module 100, an inverter 300, a power grid 500, and a control system 700. The photovoltaic module 100 may also be referred to as a photovoltaic string. The photovoltaic module 100 may be one or more strings.

The photovoltaic module 100 is connected to the inverter 300. The inverter 300 is connected to the power grid 500. The inverter 300 and the control system 700 can communicate with each other. For example, the control system sends an instruction to the inverter.

When the solar power generation system shown in FIG. 1 works in a power generation mode, the photovoltaic module 100 converts solar energy into a direct current, the inverter 300 converts the direct current into an alternating current, and the grid 500 transmits the alternating current.

It should be understood that the solar power generation system shown in FIG. 1 is merely an example. The solar power generation system in this embodiment of this application may further include more apparatuses or devices. For example, a transformer may be further included.

Alternatively, the solar power generation system in this embodiment of this application may include fewer apparatuses or devices. For example, the control system 700 may not be included.

Alternatively, the solar power generation system in this embodiment of this application may include a similar apparatus or device. For example, the power grid 500 may be replaced with an energy storage apparatus.

Alternatively, each apparatus or device in the solar power generation system in this embodiment of this application may further include more functions. For example, the inverter 300 may further have a communication function.

It should be understood that a connection described in this embodiment of this application may be a direct connection or an indirect connection. For example, the inverter 300 may be connected to the power grid 500 by using a transformer.

Figure 2:
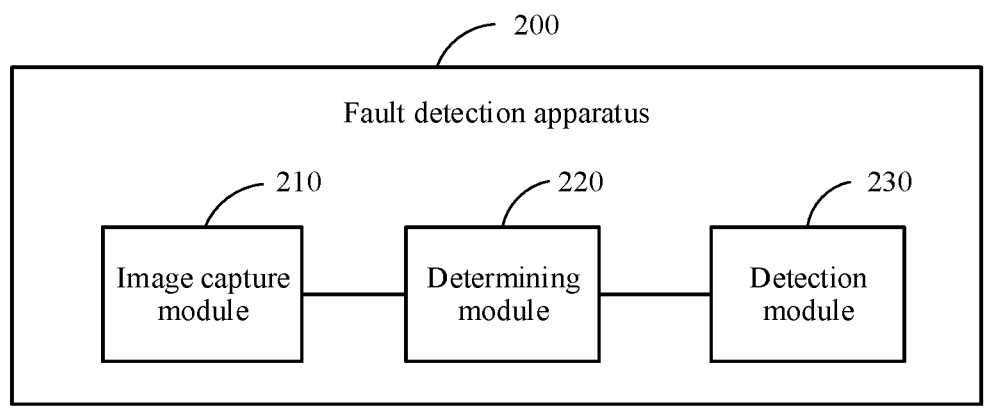
FIG. 2 is a diagram of function modules of a fault detection apparatus according to an embodiment of this application.
Figure 3:
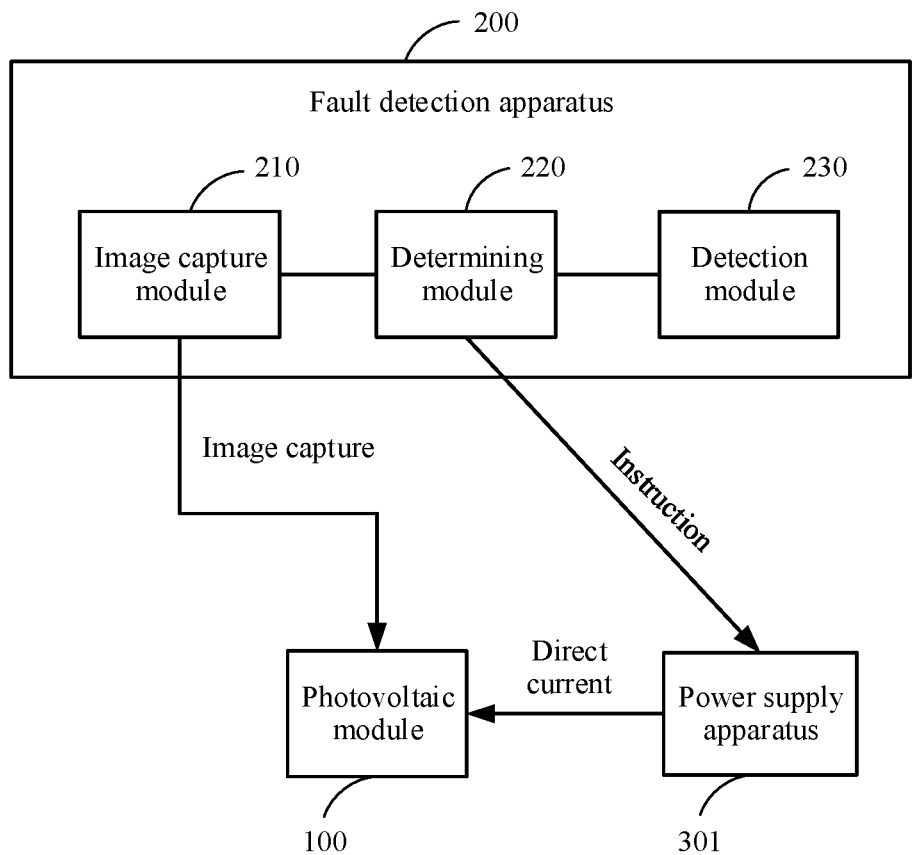
FIG. 3 is a schematic application diagram of a fault detection apparatus according to an embodiment of this application.

Referring to FIG. 2 and FIG. 3, FIG. 2 is a diagram of function modules of a fault detection apparatus 200 according to an embodiment of this application, and FIG. 3 is a schematic application diagram of the fault detection apparatus 200. The fault detection apparatus 200 includes an image capture module 210, a determining module 220, and a detection module 230. The image capture module 210 is configured to capture an image of the photovoltaic module 100 in a light emitting state. The determining module 220 is configured to determine whether a signal-to-noise ratio of the image is maximized, and generate a detection instruction when the signal-to-noise ratio of the image is maximized. The detection module 230 is configured to perform fault detection on the photovoltaic module 100 based on the image when receiving the detection instruction, to identify a fault type of the photovoltaic module 100.

It may be understood that the foregoing function modules may be stored in a memory in a form of software, and executed by a processor. In an alternative embodiment, the foregoing function modules may be hardware with a specific function, for example, a chip on which a specific software program is programmed.

In this embodiment of this application, an electroluminescent effect occurs in the photovoltaic module 100 under action of electric energy transmitted by power supply equipment 301, so that the photovoltaic module 100 emits light. When the photovoltaic module 100 is in the light emitting state, the image captured by the image capture module 210 may be referred to as an EL image. In another embodiment, the photovoltaic module 100 may further emit light under action of an excitation light source. For example, the excitation light source may be an excitation light source having a specific wavelength.

It should be understood that the power supply equipment 301 may be an external power supply, another photovoltaic string, or the inverter 300. When the power supply equipment 301 is an external direct current power supply, a direct current may be transmitted to the photovoltaic module 100 through a power port on the photovoltaic module 100. When the external power supply is an alternating current power supply, a rectifier may be used to convert an alternating current in the external power supply into a direct current, and the direct current is transmitted to the photovoltaic module 100 through the power port on the photovoltaic module 100.

Figure 4:
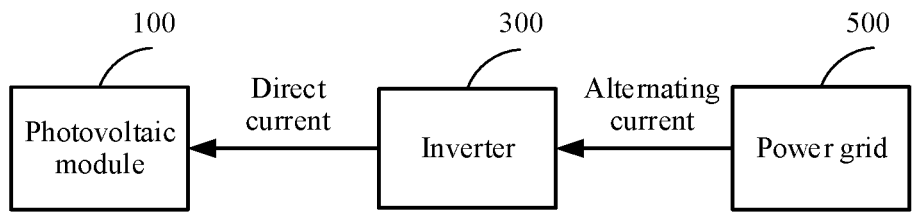
FIG. 4 is a schematic diagram of electric energy conversion according to an embodiment of this application.

As shown in FIG. 4, when the power supply equipment 301 is the inverter 300, the inverter 300 converts an alternating current in the power grid 500 into a direct current, and transmits the direct current to the photovoltaic module 100. Specifically, the inverter 300 may implement alternating current (AC) to direct current (DC) conversion by using an inverter circuit of the inverter, to convert the alternating current in the power grid 500 into the direct current, and transmit the direct current to the photovoltaic module 100.

In this embodiment of this application, the inverter 300 transmits electrical energy to the photovoltaic module 100, so that in a case of a single transmission of electrical energy to the photovoltaic module 100, an electroluminescent effect may occur in all photovoltaic modules 100 connected to the inverter 300, so that EL images of all the photovoltaic modules 100 connected to the inverter 300 can be captured and fault detection can be performed. In this way, there is no need to spend time searching for a power port of the photovoltaic module 100, thereby helping improve fault detection efficiency.

Figure 5:
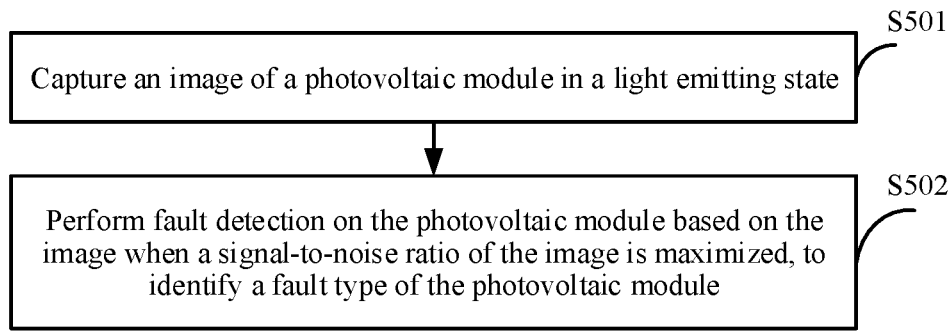
FIG. 5 is a flowchart of a fault detection method for a photovoltaic module according to an embodiment of this application.

The following describes in detail each function module in the fault detection apparatus 200 in FIG. 2 with reference to FIG. 5. FIG. 5 is a flowchart of a fault detection method for a photovoltaic module according to an embodiment of this application. It should be understood that FIG. 5 shows steps or operations of the fault detection method, but these steps or operations are merely examples. In this embodiment of this application, other operations or variations of the operations in FIG. 5 may be further performed. In addition, the steps in FIG. 5 may be performed in a sequence different from that presented in FIG. 5, and it is possible that not all the operations in FIG. 5 need to be performed.

Step S501: The image capture module 210 captures an image of the photovoltaic module 100 in a light emitting state.

Because all problems of the photovoltaic module can be detected through infrared detection, in this embodiment of this application, when the power supply equipment 301 provides electrical energy for the photovoltaic module 100, the photovoltaic module 100 emits an infrared light signal. Optionally, the image capture module 210 may capture the image of the photovoltaic module by using an infrared camera.

Step S502: The detection module 230 performs fault detection on the photovoltaic module 100 based on the image when a signal-to-noise ratio of the image is maximized, to identify a fault type of the photovoltaic module.

When the signal-to-noise ratio of the image is maximized, definition of the image is optimal, that is, resolution of the image is highest.

It should be understood that, in a photovoltaic power station, due to an external environment factor (temperature, wind speed, and rainy weather), when same electric energy is provided for the photovoltaic module 100, quality of images captured by the image capture module 210 is different. That is, when the power supply equipment 301 provides the same electric energy, the image capture module 210 can capture an image of relatively good quality in an indoor environment, and in an outdoor environment, an image captured by the image capture module 210 cannot meet a fault identification requirement of subsequent fault detection due to impact of an external environment. Therefore, in this embodiment of this application, when it is determined that the signal-to-noise ratio of the image is maximized (that is, the quality is optimal), a subsequent fault detection step is performed, so that the fault identification requirement of the subsequent fault detection can still be met under impact of an external factor.

In this embodiment of this application, the fault type of the photovoltaic module 100 may be detected by performing EL detection on the image captured by the image capture module 210. Types of faults that greatly affect a power generation capacity include: module open circuit, module failure, module diode short circuit, module PID attenuation, module electrical performance mismatch (inconsistent module electrical performance due to attenuation, irradiation, or the like), module hidden crack, broken glass, module internal resistance abnormality (aging, falling off, or the like of a solder busbar), and the like.

According to the fault detection method for the photovoltaic module disclosed in this embodiment of this application, fault detection is performed on the photovoltaic module 100 based on the image only when it is determined that the signal-to-noise ratio of the image is maximized. In this way, quality of the image captured by the image capture module 210 can be ensured even under impact of an external environment factor, and a subsequent fault identification requirement can be met.

Figure 6:
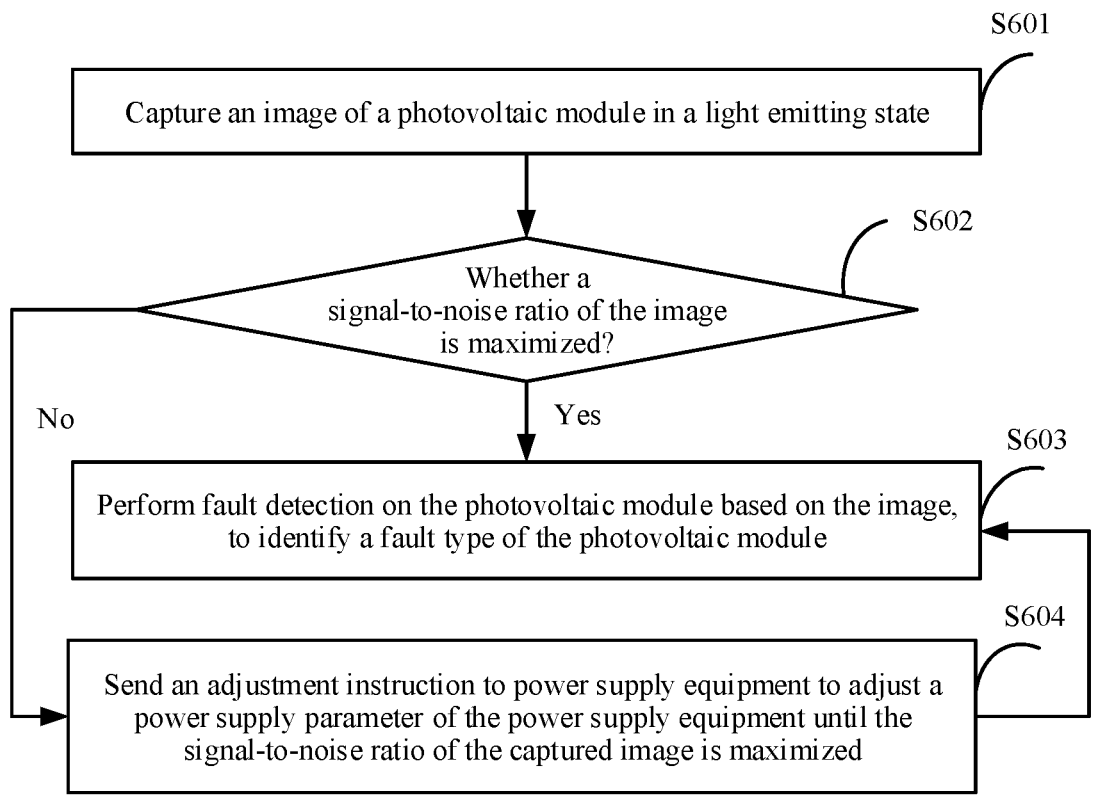
FIG. 6 is a flowchart of a fault detection method for a photovoltaic module according to another embodiment of this application.

FIG. 6 is a flowchart of a fault detection method for a photovoltaic module according to another embodiment of this application. In this embodiment of this application, the fault detection method includes the following steps.

Step S601: The image capture module 210 captures an image of the photovoltaic module 100 in a light emitting state.

Step S601 is the same as step S501, and details are not described herein again.

Step S602: The determining module 220 determines whether a signal-to-noise ratio of the image is maximized. If yes, step S603 is performed. If no, step S604 is performed.

In this embodiment of this application, if the signal-to-noise ratio of the image is not maximized, it indicates that due to an external environmental factor, electric energy provided by the power supply equipment 301 causes poor quality of the image captured by the image capture module 210. Therefore, step S605 needs to be performed to adjust the electric energy provided by the power supply equipment 301, so that the image capture module 210 captures an image whose signal-to-noise ratio is maximized.

Step S603: The detection module 230 performs fault detection on the photovoltaic module 100 based on the image, to identify a fault type of the photovoltaic module 100.

Step S603 is the same as step S502, and details are not described herein again.

Step S604: The determining module 220 sends an adjustment instruction to the power supply equipment 301 to adjust a power supply parameter of the power supply equipment 301 until the signal-to-noise ratio of the captured image is maximized.

When the power supply parameter of the power supply equipment 301 is adjusted to maximize the signal-to-noise ratio of the image captured by the image capture module 210, step S603 is then performed to complete subsequent detection.

In this embodiment of this application, if the signal-to-noise ratio of the image is not maximized, the determining module 220 sends the adjustment instruction to the power supply equipment 301 to adjust the power supply parameter, to form closed-loop control of image capture, so that a light emitting image with a maximized signal-to-noise ratio can be captured. In this way, the image whose signal-to-noise ratio is maximized can be captured without manual confirmation, thereby simplifying an image capture process.

In an embodiment, that the determining module 220 sends the adjustment instruction to the power supply equipment 301 to adjust the power supply parameter of the power supply equipment 301 specifically includes: The determining module 220 sends the adjustment instruction to the power supply equipment 301, and the power supply equipment 301 adjusts the power supply parameter based on the adjustment instruction and a preset curve. The power supply parameter includes a voltage parameter, a current parameter, or a power parameter. The preset curve may be a preset voltage curve, a preset current curve, or a preset power curve. In this way, a power supply parameter corresponding to the maximized signal-to-noise ratio of the image can be found as soon as possible, and image capture efficiency can be improved.

It should be noted that, the preset curve may be a correspondence that is between different currents (voltages or powers) and faults and that is obtained by a tester based on a plurality of tests. For example, the current parameter is usually set to 7 A to 8 A when internal defect faults such as a cell crack, a cell fragment, and a cell broken finger are tested normally. The current parameter is usually set to 1 A to 3 A when faults such as a cell black heart, a cell black edge, a low-efficiency cell, different gear power, attenuation, hot spot induced degradation, and PID are tested. Therefore, adjusting the power supply parameter based on the preset curve can simplify an image capture process, so that the image whose signal-to-noise ratio is maximized can be relatively quickly obtained, thereby improving fault detection efficiency.

Different faults of the module may correspond to different power supply parameters, that is, only some faults may be analyzed after one image capture. Therefore, to meet different requirements for module defect identification granularities, the power supply parameter needs to be set in segments, and a light emitting image of the module with an optimized signal-to-noise ratio under each power supply parameter segment is captured. For example, faults such as a cell black heart, a cell black edge, a low-efficiency cell, different gear power, attenuation, hot spot induced degradation, and PID can be detected by using a relatively low current parameter, while faults such as a cell crack, a cell fragment, and a cell broken finger can be detected by using a relatively high current parameter.

Therefore, in some embodiments, the power supply parameter includes a first power supply parameter segment (for example, 1 A to 3 A) and a second power supply parameter segment (for example, 7 A to 8 A). The fault type includes a first fault type and a second fault type. The first power supply parameter segment corresponds to the first fault type, and the second power supply parameter segment corresponds to the second fault type. In other words, the first fault type can be identified by performing the foregoing steps S601 to S604 by using the first power supply parameter segment, and the second fault type can be identified by performing the foregoing steps S601 to S604 by using the second power supply parameter segment, thereby improving integrity of module defect identification.

The first power supply parameter segment and the second power supply parameter segment may or may not overlap. This is not limited herein.

In some other embodiment manners, that the determining module 220 sends the adjustment instruction to the power supply equipment 301 to adjust the power supply parameter of the power supply equipment 301 specifically includes: The determining module 220 sends the adjustment instruction to the power supply equipment, and the power supply equipment 301 adjusts the power supply parameter based on the adjustment instruction and a reference curve. The reference curve may be a current-voltage (IV) reference curve, a power-current (PI) reference curve, or a power-voltage (PV) reference curve. The power supply parameter includes a voltage parameter, a current parameter, or a power parameter.

The reference curve is a curve in which any two power supply parameters (for example, a current voltage, a current power, or a voltage power) change according to a particular rule, and the curve may change depending on different current environments.

Figure 7:
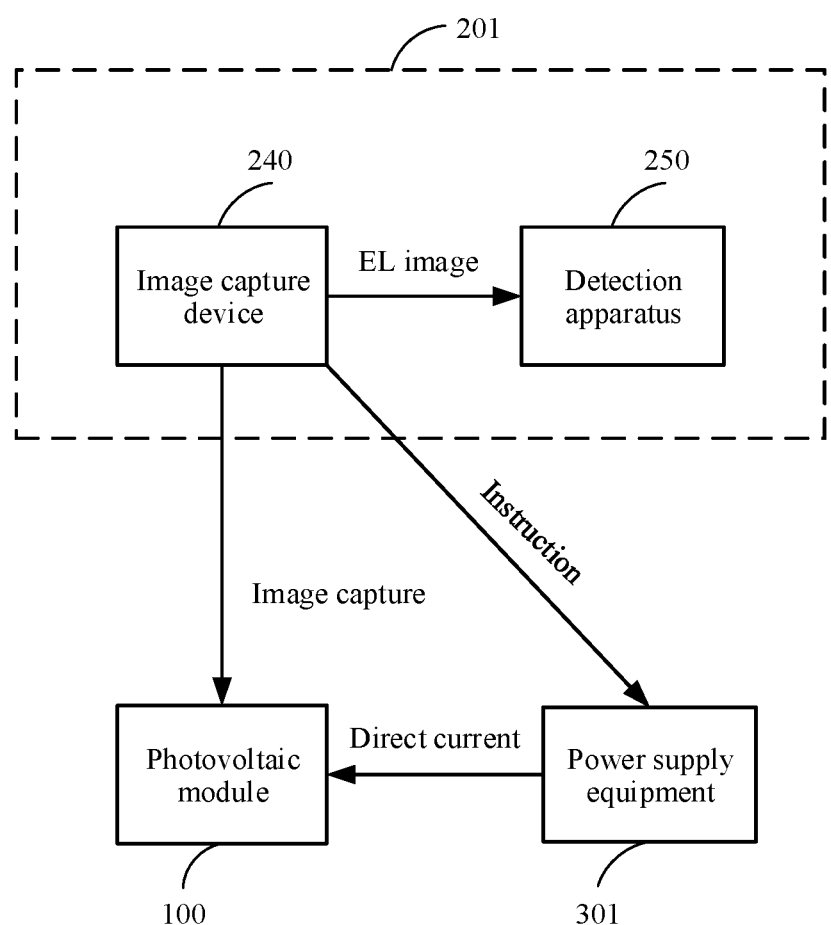
FIG. 7 is a schematic application diagram of a fault detection system according to an embodiment of this application.

FIG. 7 is a schematic application diagram of a fault detection system 201 according to another embodiment of this application. Different from in the fault detection apparatus 200 in FIG. 2, in this embodiment of this application, each function module is located on a discrete body. The fault detection system 201 includes an image capture device 240 and a detection apparatus 250. The image capture device 240 is configured to capture an image of the photovoltaic module 100 in a light emitting state. The detection apparatus 250 is configured to perform fault detection on the photovoltaic module 100 based on the image captured by the image capture device 240, to identify a fault type of the photovoltaic module 100.

In this embodiment of this application, an electroluminescent effect occurs in the photovoltaic module 100 under action of electric energy transmitted by the power supply equipment 301, so that the photovoltaic module 100 emits light. When the photovoltaic module 100 is in the light emitting state, the image captured by the image capture device 240 may be referred to as an EL image. In another embodiment, the photovoltaic module 100 may further emit light under action of an excitation light source. For example, the excitation light source may be an excitation light source having a specific wavelength.

Figure 8:
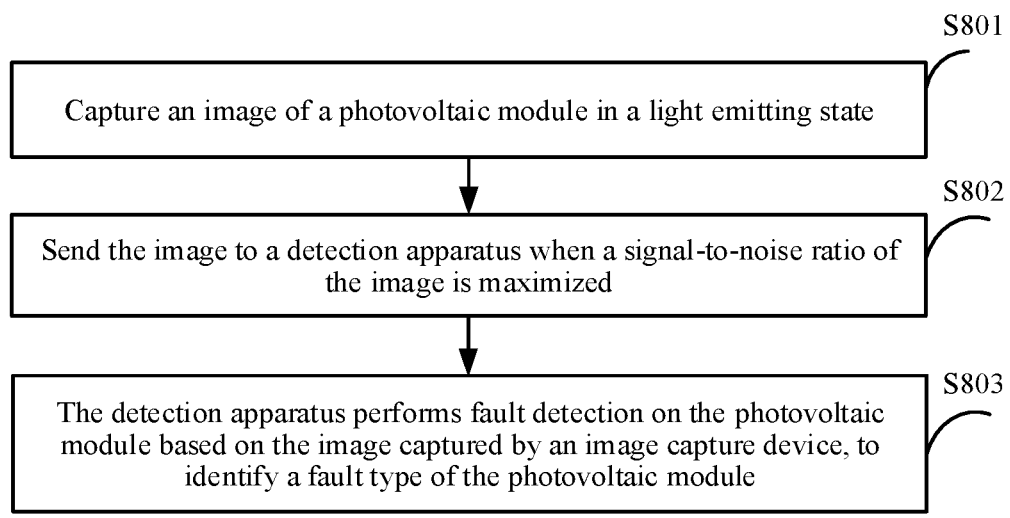
FIG. 8 is a flowchart of a fault detection method for a photovoltaic module according to still another embodiment of this application.

The following describes in detail the fault detection system 201 in FIG. 7 with reference to FIG. 8. FIG. 8 is a flowchart of a fault detection method for a photovoltaic module according to another embodiment of this application. It should be understood that FIG. 8 shows steps or operations of the fault detection method, but these steps or operations are merely examples. In this embodiment of this application, other operations or variations of the operations in FIG. 8 may be further performed. In addition, the steps in FIG. 8 may be performed in a sequence different from that presented in FIG. 8, and it is possible that not all the operations in FIG. 8 need to be performed.

Step S801: The image capture device 240 captures an image of the photovoltaic module 100 in a light emitting state.

Step S802: The image capture device 240 sends the image to the detection apparatus 250 when a signal-to-noise ratio of the image is maximized.

When the signal-to-noise ratio of the image is maximized, definition of the image is optimal, that is, resolution of the image is highest.

Step S803: The detection apparatus 250 performs fault detection on the photovoltaic module 100 based on the image captured by the image capture device 240, to identify a fault type of the photovoltaic module 100.

In this embodiment of this application, the fault type of the photovoltaic module 100 may be detected by performing EL detection on the image captured by the image capture device 240. Types of faults that greatly affect a power generation capacity include: module open circuit, module failure, module diode short circuit, module PID attenuation, module electrical performance mismatch (inconsistent module electrical performance due to attenuation, irradiation, or the like), module hidden crack, broken glass, module internal resistance abnormality (aging, falling off, or the like of a solder busbar), and the like.

According to the fault detection method for the photovoltaic module disclosed in this embodiment of this application, when it is determined that the signal-to-noise ratio of the image is maximized, the image capture device 240 sends the image to the detection apparatus 250 to perform fault detection, so that quality of the image captured by the image capture device 240 can be ensured even under impact of an external environment factor, and a subsequent fault identification requirement can be met.

Figure 9:
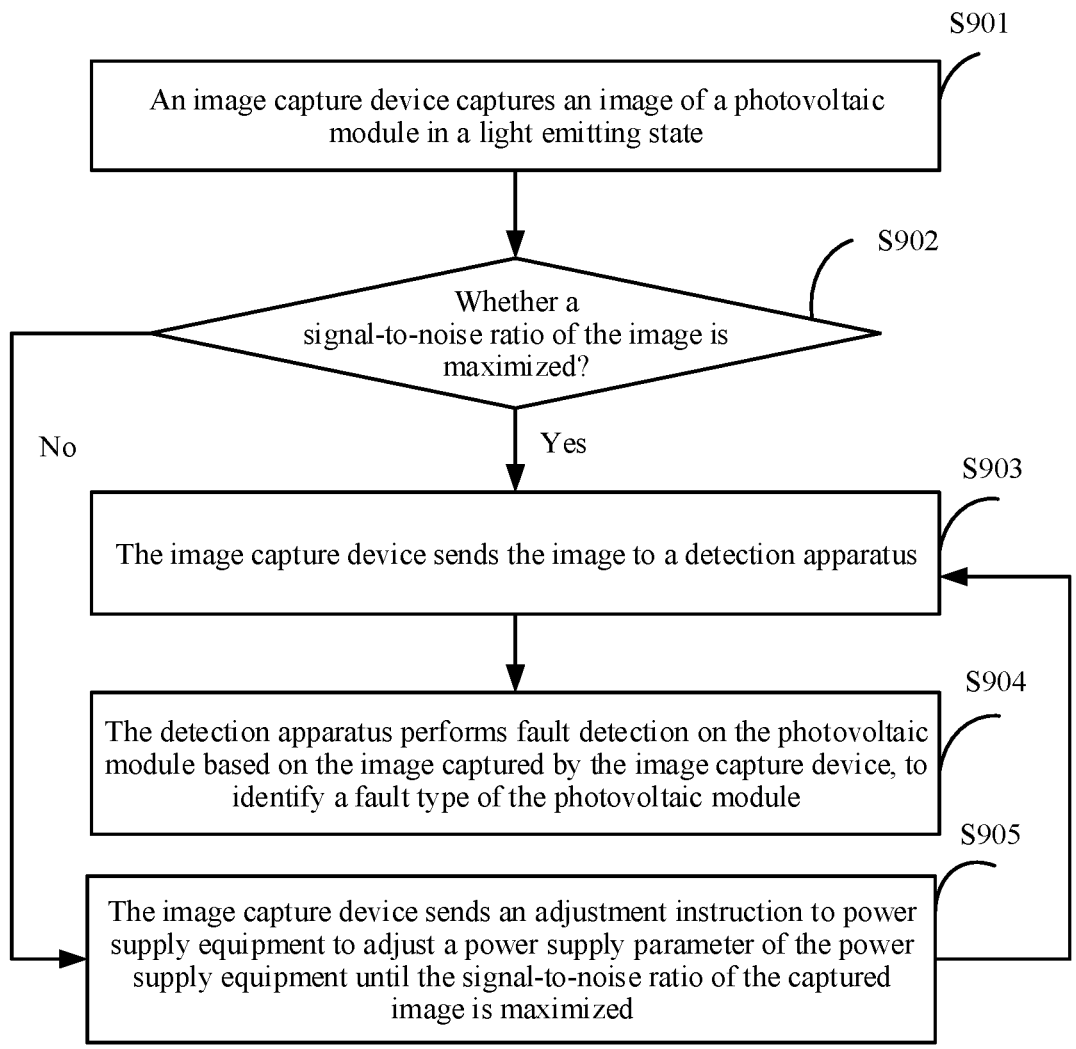
FIG. 9 is a flowchart of a fault detection method for a photovoltaic module according to yet another embodiment of this application.

FIG. 9 is a flowchart of a fault detection method for a photovoltaic module according to still another embodiment of this application. In this embodiment of this application, the fault detection method includes the following steps.

Step S901: The image capture device 240 captures an image of the photovoltaic module 100 in a light emitting state.

Step S901 is the same as step S801, and details are not described herein again.

Step S902: The image capture device 240 determines whether a signal-to-noise ratio of the image is maximized. If yes, step S903 is performed. If no, step S905 is performed.

In this embodiment of this application, if the signal-to-noise ratio of the image is not maximized, it indicates that due to an external environmental factor, electric energy provided by the power supply equipment 301 causes poor quality of the image captured by the image capture device 240. Therefore, step S605 needs to be performed to adjust the electric energy provided by the power supply equipment 301, so that the image capture device 240 captures an image with a maximized signal-to-noise ratio.

Step S903: The image capture device 240 sends the image to the detection apparatus 250.

Step S903 is the same as step S802, and details are not described herein again.

Step S904: The detection apparatus 250 performs fault detection on the photovoltaic module 100 based on the image captured by the image capture device 240, to identify a fault type of the photovoltaic module 100.

Step S904 is the same as step S803, and details are not described herein again.

Step S905: The image capture device 240 sends an adjustment instruction to the power supply equipment 301 to adjust a power supply parameter of the power supply equipment 301 until the signal-to-noise ratio of the captured image is maximized.

When the power supply parameter of the power supply equipment 301 is adjusted to maximize the signal-to-noise ratio of the image captured by the image capture device 240, step S903 is then performed to complete subsequent detection.

In this embodiment of this application, if the signal-to-noise ratio of the image is not maximized, the image capture device 240 sends the adjustment instruction to the power supply equipment 301 to adjust the power supply parameter, to form closed-loop control of image capture, so that a light emitting image with a maximized signal-to-noise ratio can be captured. In this way, the image whose signal-to-noise ratio is maximized can be captured without manual confirmation, thereby simplifying an image capture process.

In an embodiment, that the image capture device 240 sends the adjustment instruction to the power supply equipment 301 to adjust the power supply parameter of the power supply equipment 301 specifically includes: The image capture device 240 sends the adjustment instruction to the power supply equipment, and the power supply equipment 301 adjusts the power supply parameter based on the adjustment instruction and a preset curve. The power supply parameter includes a voltage parameter, a current parameter, or a power parameter. The preset curve may be a preset voltage curve, a preset current curve, or a preset power curve. In this way, a power supply parameter corresponding to the maximized signal-to-noise ratio of the image can be found as soon as possible, and image capture efficiency can be improved.

In some other embodiments, that the image capture device 240 sends the adjustment instruction to the power supply equipment 301 to adjust the power supply parameter of the power supply equipment 301 specifically includes: The image capture device 240 sends the adjustment instruction to the power supply equipment, and the power supply equipment 301 adjusts the power supply parameter based on the adjustment instruction and a reference curve. The reference curve may be a current-voltage (IV) reference curve, a power-current (PI) reference curve, or a power-voltage (PV) reference curve. The power supply parameter includes a voltage parameter, a current parameter, or a power parameter. In this way, a power supply parameter corresponding to the maximized signal-to-noise ratio of the image can be found as soon as possible, and image capture efficiency can be improved.

The reference curve is a curve in which any two power supply parameters (for example, a current voltage, a current power, or a voltage power) change according to a particular rule, and the curve may change depending on different current environments.

In some embodiments, the power supply parameter includes a first power supply parameter segment (for example, 1 A to 3 A) and a second power supply parameter segment (for example, 7 A to 8 A). The fault type includes a first fault type and a second fault type. The first power supply parameter segment corresponds to the first fault type, and the second power supply parameter segment corresponds to the second fault type. In other words, the first fault type can be identified by performing the foregoing steps S901 to S905 by using the first power supply parameter segment, and the second fault type can be identified by performing the foregoing steps S901 to S905 by using the second power supply parameter segment, thereby improving integrity of module defect identification.

The embodiments in this specification are all described in a progressive manner, for same or similar parts in the embodiments, refer to these embodiments, and each embodiment focuses on a difference from other embodiments. The method disclosed in the embodiments corresponds to the apparatus disclosed in the embodiments, and therefore is briefly described. For related parts, refer to the description of the apparatus.

It should be noted that, for brief description, the foregoing method embodiments are represented as a series of actions. However, a person skilled in the art should appreciate that this application is not limited to the described order of the actions, because according to this application, some steps may be performed in other orders or simultaneously.

A sequence of the steps of the method in the embodiments of this application may be adjusted, combined, or removed based on an actual requirement.

The fault detection method for the photovoltaic module provided in this application may be implemented in hardware and firmware, or may be used as software or computer code that can be stored in a computer-readable storage medium such as a read-only memory (ROM), a random access memory (RAM for short), a floppy disk, a hard disk, or a magneto-optical disk, or may be used as computer code that can be originally stored in a remote recording medium or a non-transitory machine-readable medium, downloaded over a network, and stored in a local recording medium. Therefore, the method described herein may be presented, by using a general purpose computer or a special processor, or in programmable or dedicated hardware such as an application-specific integrated circuit (ASIC) or a field programmable gate array (FPGA), as software stored in a recording medium. As can be understood in the art, a computer, a processor, a microprocessor, a controller, or programmable hardware includes a memory component, for example, a RAM, a ROM, or a flash memory. When the computer, the processor, or the hardware implements the processing method described herein to access and execute software or computer code, the memory component may store or receive the software or the computer code. Moreover, when the general purpose computer accesses code for performing the processing shown herein, execution of the code converts the general purpose computer to a dedicated computer for performing the processing shown herein.

The computer-readable storage medium may be a solid-state memory, a memory card, an optical disc, or the like. The computer-readable storage medium stores a program instruction to be invoked by the fault detection apparatus for the photovoltaic module in this application to perform the fault detection method for the photovoltaic module.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A fault detection method for a photovoltaic module, comprising:
capturing an image of the photovoltaic module in a light emitting state; and
performing detection on the photovoltaic module based on the image when a signal-to-noise ratio of the image is maximized, to identify a fault type of the photovoltaic module;
wherein the photovoltaic module emits light in response to action of power supply equipment;
wherein the fault detection method further comprises:
determining whether the signal-to-noise ratio of the image is maximized; and
when the signal-to-noise ratio of the image is not maximized, sending an adjustment instruction to a power supply equipment to adjust a power supply parameter of the power supply equipment until the signal-to-noise ratio of the image is maximized;
wherein the sending an adjustment instruction to the power supply equipment to adjust a power supply parameter of the power supply equipment comprises: sending the adjustment instruction to the power supply equipment, so that the power supply equipment adjusts the power supply parameter based on a preset curve or a reference curve; and wherein the power supply parameter comprises a current parameter, a voltage parameter, or a power parameter; and corresponding to the power supply parameter, the preset curve is a preset current curve, a preset voltage curve, or a preset power curve; and corresponding to the power supply parameter, the reference curve comprises a current-voltage reference curve, a power-voltage reference curve, or a power-current reference curve.

2. The fault detection method according to claim 1, wherein when the signal-to-noise ratio of the image is maximized, resolution of the image is highest.

3. A fault detection apparatus for a photovoltaic module, wherein the fault detection apparatus comprises:

an image capture device configured to capture an image of the photovoltaic module in a light emitting state; and a processor configured to perform fault detection on the photovoltaic module based on the image when a signal-to-noise ratio of the image is maximized, to identify a fault type of the photovoltaic module;

wherein the photovoltaic module emits light in response to action of power supply equipment;

wherein the processor is configured to determine whether the signal-to-noise ratio of the image is maximized, and when the signal-to-noise ratio of the image is not maximized, send an adjustment instruction to the power supply equipment to adjust a power supply parameter of the power supply equipment until the signal-to-noise ratio of the captured image is maximized;

and wherein the power supply equipment is configured to adjust the power supply parameter based on the adjustment instruction and a preset curve, and wherein the power supply parameter comprises a current parameter, a voltage parameter, or a power parameter; and corresponding to the power supply parameter, the preset curve comprises a preset current curve, a preset voltage curve, or a preset power curve.

4. The fault detection apparatus according to claim 3, wherein the power supply parameter comprises a first power supply parameter segment and a second power supply parameter segment; the fault type comprises a first fault type and a second fault type; and the first power supply parameter segment corresponds to the first fault type, and the second power supply parameter segment corresponds to the second fault type.

5. The fault detection apparatus according to claim 3, wherein the power supply parameter comprises a first power supply parameter segment and a second power supply parameter segment; the fault type comprises a first fault type and a second fault type; and the first power supply parameter segment corresponds to the first fault type, and the second power supply parameter segment corresponds to the second fault type.

6. The fault detection apparatus according to claim 3, wherein when the signal-to-noise ratio of the image is maximized, resolution of the image is highest.

7. A computer-readable storage medium, wherein the computer-readable storage medium stores a program instruction, wherein when the program instruction is executed by a device comprising a processor, the instructions cause the device to:

capture an image of the photovoltaic module in a light emitting state; and perform fault detection on the photovoltaic module based on the image when a signal-to-noise ratio of the image is maximized, to identify a fault type of the photovoltaic module;

wherein the photovoltaic module emits light in response to action of power supply equipment;

wherein the instructions further cause the device to:

determine whether the signal-to-noise ratio of the image is maximized; and when the signal-to-noise ratio of the image is not maximized, send an adjustment instruction to a power supply equipment to adjust a power supply parameter of the power supply equipment until the signal-to-noise ratio of the image is maximized;

wherein the send an adjustment instruction to the power supply equipment to adjust a power supply parameter of the power supply equipment comprises: send the adjustment instruction to the power supply equipment, so that the power supply equipment adjusts the power supply parameter based on a preset curve or a reference curve; and wherein the power supply parameter comprises a current parameter, a voltage parameter, or a power parameter; and corresponding to the power supply parameter, the preset curve is a preset current curve, a preset voltage curve, or a preset power curve; and corresponding to the power supply parameter, the reference curve comprises a current-voltage reference curve, a power-voltage reference curve, or a power-current reference curve.

\* \* \* \* \*